United States Patent
Varadan et al.

(10) Patent No.: US 10,810,161 B1
(45) Date of Patent: *Oct. 20, 2020

(54) SYSTEM AND METHOD FOR DETERMINING PHYSICAL STORAGE SPACE OF A DEDUPLICATED STORAGE SYSTEM

(71) Applicant: EMC Corporation, Hopkinton, MA (US)

(72) Inventors: Srikant Varadan, San Jose, CA (US); Dheer Moghe, Belmont, CA (US); Sazzala Reddy, Los Altos, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 554 days.

This patent is subject to a terminal disclaimer.

(21) Appl. No.: 14/183,061

(22) Filed: Feb. 18, 2014

Related U.S. Application Data (63) Continuation of application No. 13/629,573, filed on Sep. 27, 2012, now Pat. No. 8,700,578.

(51) Int. Cl.
  *G06F 16/174* (2019.01)
(52) U.S. Cl.
  CPC ............... *G06F 16/1748* (2019.01)
(58) Field of Classification Search
  CPC .... G06F 3/0643; G06F 3/0608; G06F 3/0641; G06F 17/30067; G06F 3/0665; G06F 3/0671; H04L 67/1097
  See application file for complete search history.

(56) References Cited

U.S. PATENT DOCUMENTS

| | | | |
|---|---|---|---|
| 6,078,745 A | * | 6/2000 | De Greef .............. G06F 8/4434 717/151 |
| 7,174,336 B2 | | 2/2007 | Campos et al. |
| 7,590,642 B2 | | 9/2009 | Campos et al. |

(Continued)

OTHER PUBLICATIONS

Swamidass and Baldi, Mathematical Correction for Fingerprint Similarity Measures to Improve Chemical Retrieval (Year: 2007).*

(Continued)

*Primary Examiner* — James Trujillo
*Assistant Examiner* — Kurt A Mueller
(74) *Attorney, Agent, or Firm* — Womble Bond Dickinson (US) LLP (57) ABSTRACT

Exemplary methods, apparatuses, and systems maintain a plurality of summary data structures corresponding to a plurality of logical file system namespaces representing a plurality of hierarchies of one or more directories having one or more files, each file being stored in the storage system as a plurality of segments in a deduplicated manner. In response to a request to estimate a storage usage by a first of the file system namespace, identify a first of the summary data structures corresponding to the first file system namespace, wherein the first summary data structure stores information summarizing deduplicated segments referenced by one or more files of the first file system namespace. Estimate the storage usage of the first file system namespace based on the first summary data structure and a global summary data structure, wherein the global summary data structure stores information summarizing deduplicated segments referenced by all of the file system namespaces.

21 Claims, 8 Drawing Sheets

(56) References Cited

U.S. PATENT DOCUMENTS

| | | | | |
|---|---|---|---|---|
| 8,615,389 | B1* | 12/2013 | Marcu | G06F 17/2715 704/1 |
| 8,762,362 | B1* | 6/2014 | Sathe | G06F 16/9027 707/706 |
| 8,762,396 | B2* | 6/2014 | Hudzia | G06F 16/2255 707/754 |
| 9,152,661 | B1* | 10/2015 | Sathe | G06F 16/90339 |
| 2006/0248052 | A1* | 11/2006 | Zurek | G06F 17/30424 |
| 2006/0294311 | A1* | 12/2006 | Fu | G06F 16/951 711/118 |
| 2007/0136331 | A1* | 6/2007 | Hasan | G06F 16/9014 |
| 2008/0082628 | A1* | 4/2008 | Rowstron | G06F 16/2453 709/217 |
| 2011/0069632 | A1* | 3/2011 | Chen | H04L 43/026 370/253 |
| 2011/0179250 | A1* | 7/2011 | Matsuzawa | G06F 3/0608 711/209 |
| 2011/0225191 | A1* | 9/2011 | Xie | G06F 17/30631 707/775 |
| 2013/0117526 | A1* | 5/2013 | Florendo | G06F 3/0622 711/171 |
| 2013/0204903 | A1* | 8/2013 | Hao | G06F 16/152 707/802 |
| 2013/0219117 | A1* | 8/2013 | Macko | G06F 3/068 711/112 |
| 2013/0297572 | A1 | 11/2013 | Wilson et al. | |
| 2014/0013027 | A1* | 1/2014 | Jannyavula Venkata | G06F 12/0866 711/103 |
| 2014/0013052 | A1* | 1/2014 | Sawin | G06F 12/0862 711/122 |

OTHER PUBLICATIONS

Wikipedia contributors. (Apr. 13, 2020). Bloom filter. In Wikipedia, the Free Encyclopedia. Retrieved 17:37, Apr. 14, 2020, from https://en.wikipedia.org/w/index.php?title=Bloom_filter&oldid=950760770 (Year: 2020).*

Zhu, Benjamin, et al., "Avoiding the Disk Bottleneck in the Data Domain Deduplication File System", FAST '08: 6th USENIX Conference on File and Storage Technologies, USENIX Association, pp. 269-282, (2008).

* cited by examiner

SYSTEM AND METHOD FOR DETERMINING PHYSICAL STORAGE SPACE OF A DEDUPLICATED STORAGE SYSTEM

CROSS-REFERENCE TO RELATED APPLICATIONS

This application is a continuation of application Ser. No. 13/629,573, filed Sep. 27, 2012, which is hereby incorporated by reference.

FIELD OF THE INVENTION

Embodiments of the present invention relate generally to data storage systems. More particularly, embodiments of the invention relate to estimating the physical space that is uniquely utilized by a collection of logical objects in a deduplicated storage system.

BACKGROUND

A deduplicating storage system consists of several levels of logical data abstraction above the physical disk storage. At the highest level, a namespace exists which allows a user to access data stored on the disk through an external application which resides on a client. A user can access data through any of the following protocols: virtual tape libraries (VTL), Data Domain BOOST, Common Internet File system (CIFS), and Network File System (NFS). A deduplicating storage system may use any combination of these simultaneously to store and access data.

The next level of abstraction includes a collection of logical objects or domains, such as MTrees, which are defined based on the file system of the storage system. Each MTree is a mountable file system, with its own policies for snapshots, replication, quotas, etc. MTrees create "virtual volumes" that can be managed independent of the physical storage that they use. Stored within each MTree is one or more hierarchies of one or more directories (i.e., directories with subdirectories) of each namespace, and stored within each directory or subdirectory are files, e.g., user text files, audio or video files. Snapshots may also be created at this level of abstraction. A snapshot is an image of the storage system at a particular point in time, which may be used to recover files that may have been inadvertently deleted from the storage system.

At the lowest level of abstraction, the files are segmented into a collection of data segments which are stored on a physical disk. In a deduplicated storage system, the data segments are hashed to create fingerprints, which are used in determining whether the data segment already exists on the physical disk. If the generated fingerprint does not match a collection of fingerprints that is currently stored on the storage system (i.e., the data segment does not currently exist on the storage system), the data segment is written to the physical disk storage, and the new fingerprint is added the existing collection of fingerprints representing the existing data segments on the physical disk storage. On the other hand, if the fingerprint of a new data segment matches a fingerprint in the collection of existing fingerprints, then the data segment is not stored onto the physical data storage. As each file is segmented, logical linking information is stored as metadata which enables the file to be reconstructed at a later time by referencing to segments stored on physical disk using the logical links that link together a stream of fingerprints that map to segments stored on physical disk. Thus, in a deduplicated storage system, each MTree can be understood as a collection of references, via fingerprints, to the deduplicated data segments stored on the physical storage disk. The size of each segment is implementation specific. Likewise, the size of each fingerprint also varies, depending on the type of hashing function. However, although they vary in sizes, an average size of a segment is roughly 8 KB, and a typical fingerprint is roughly 20 bytes.

It is clear from the description above that, in a deduplicated storage system, a data segment on the physical disk storage device may be shared by multiple files, which may either be from the same MTree or from different MTrees. As a result, on a deduplicated storage system with multiple MTrees, the physical space taken up by each MTree depends on the segments shared within the same MTree and the segments shared with other MTrees.

In some instances, it is desirable to determine the physical space that is uniquely taken up by an MTree, i.e., a collection of data segments that are referenced exclusively by a particular MTree, and not referenced by any other MTree on the deduplicated storage system. For example, an administrator of the storage system may want to know what is the amount of physical storage space that could be saved (i.e., freed for use) if a snapshot is deleted.

Conventional space accounting schemes in dedupe systems today only account for MTrees in the logical space. As the storage systems grow larger in capacity, the backup administrator is likely to create a larger number of MTrees. Also, as storage systems are tuned to support nearline/primary workloads, the number of snapshots of the MTrees will also increase. Such space accounting schemes are no longer accurate.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, the unique footprint of an MTree in a deduplicated storage system, i.e., the physical space utilized uniquely by a particular MTree, is estimated based on a set of summary data structures that keep track of the number of references to deduplicated segments by the MTrees within a deduplicated storage system. In one embodiment, a separate summary data structure is used to represent each of the MTrees that exist on the deduplicated storage system. In other words, a summary data structure is used to keep track of the number of references to at least 1 of the deduplicated segments by each MTree, by applying one or more hash functions of a bloom filter such as a counting bloom filter (CBF) to an input element, i.e., a fingerprint of a segment referenced by an MTree, and generating a key as an output of each of the hash functions. In one embodiment, the keys that are generated serve as indexes or offsets to a summary data structure, and the entries associated with the keys are incremented by a predetermined incremental value from their current value. In addition, a global summary data structure is also used to represent all the deduplicated segments referenced by all the MTrees on the deduplicated storage system, i.e., the global summary data structure keeps track of the number of references to all the deduplicated segments referenced by all the MTrees on the deduplicated storage system. Thus, for example, a deduplicated storage system with 2 MTrees (e.g., MTree A and MTree B), would have 3 summary data structures stored on the physical disk storage: a summary data structure summarizing the number of references to the set of segments referenced by the MTree A; a summary data structure summarizing the number of references to a set of segments referenced by the MTree B; and a summary data structure summarizing the number of references to all segments referenced by both MTree A and MTree B. For the remainder of this description, summary$_{global}$ shall denote a summary data structure summarizing the number of references to all segments referenced by all MTrees in the deduplicated storage system, and summary$_x$ shall denote a summary data structure summarizing the number of references to segments referenced by MTree x within the deduplicated storage system. In one embodiment, the summary data structures are stored onto persistent physical disk storage.

In one embodiment, the unique physical space utilized by an MTree x is estimated by first creating a temporary summary data structure, summary$_{diff}$, such that summary$_{diff}$ represents the cell-wise difference between summary$_{global}$ and summary$_x$. The unique physical space of an MTree is then calculated by determining the difference between the size of summary$_{global}$ and size of summary$_{diff}$. Note that throughout this application, an MTree is used as an example of a logical object, domain, or a namespace of a file system of a storage system. However, other types of logical objects, domains, or namespaces may also be applied.

Figure 1:
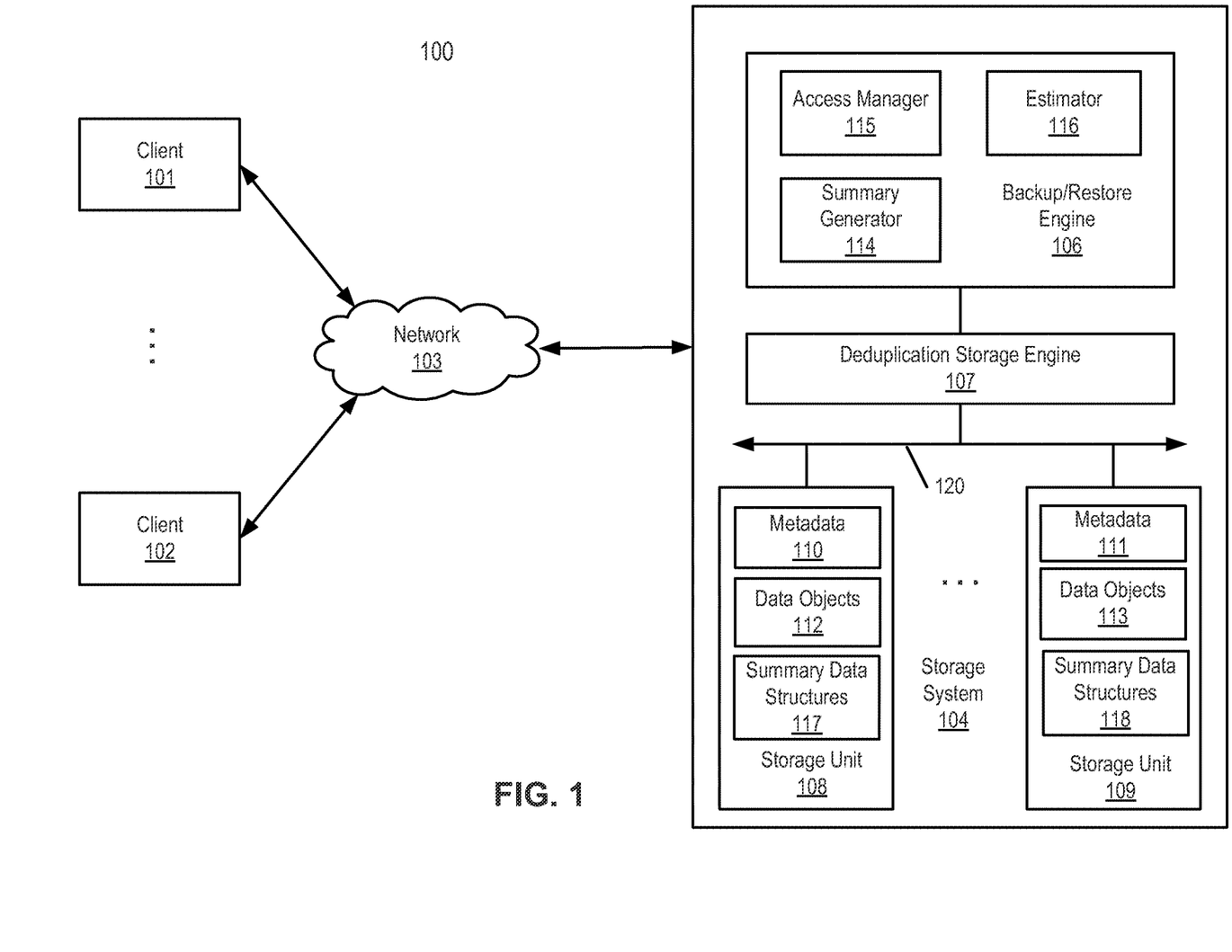
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers (e.g., cloud servers). For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup/restore engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, deduplication storage engine 107 is configured to segment the data file into multiple segments according to a variety of segmentation policies or rules. Deduplication storage engine 107 may choose not to store a segment in a storage unit if the segment has been previously stored in the storage unit. In the event that deduplication storage engine 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data segment, a compression region (CR) of data segments, or a container of one or more CRs. Fingerprints are mapped to a particular data object via metadata 110-111, enabling the system to identify the location of the data object containing a segment represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, according to one embodiment, backup engine 106 includes summary generator 114, access manager 115, and estimator 116. Access manager 115 is to provide file services to a variety of clients, such as a backup/restore application, to backup files stored in storage units 108-109, in this example, represented as data objects 112-113 that are deduplicated by deduplication storage engine 107. Typically, when a request is received to access a file such as a backup file, data objects of the requested file are loaded into a memory of storage system 104. Since the file may be large, only a portion of data objects of the file is loaded or cached in the memory at a time for accessing.

In one embodiment, summary generator 114 of storage system 104 comprises one or more bloom filters such as counting bloom filters. In response to a request to generate summary data structures, summary generator 114 is configured to receive fingerprints referenced by each MTree in the deduplicated storage system and, for each fingerprint, apply a CBF to the input fingerprint to generate one or more keys, depending on the number of hash functions, that serve as indexes to $summary_x$ and $summary_{global}$. In one aspect of the invention, the entries of the $summary_x$ and $summary_{global}$ associated with the keys are incremented by a predetermined incremental value. In one embodiment, the predetermined incremental value may be 1. Thus, for example, if the input fingerprint is referenced by MTree A, summary generator 114 would apply a CBF to generate a set of key(s) (depending on the number of hash functions), and the entry of $summary_a$ and $summary_{global}$ indexed by the key would be incremented by 1 from its current value. On the other hand, if the input fingerprint is referenced by MTree B, then summary generator 114 would apply a CBF to generate a key, and the entry of $summary_b$ and $summary_{global}$ indexed by the key would be incremented by 1 from its current value.

In one embodiment, the summary data structures are generated during a maintenance routine of the storage system, for example a garbage collection enumeration phase. It will be appreciated, however, that these summary data structures may be generated at any time during the operational duration of the storage system. Also note that throughout this application, a CBF is utilized as an example of a bloom filter. However, other types of bloom filter or fingerprint-to-index converter may also be utilized.

In response to receiving a request to estimate a storage usage by a particular MTree, estimator 116 is configured to identify and access a $summary_x$ where x is the MTree identified by an MTree ID provided to estimator 116. Estimator 116 is also configured to access $summary_{global}$. In one embodiment, the summary data structures accessed by the estimator 116 are similar to the summary data structures 117-118 of storage system 104. Next, estimator 116 performs a cell-wise subtraction between $summary_x$ and $summary_{global}$ to generate a temporary data structure, $summary_{diff}$. Thus, each entry of $summary_{diff}$ indexed by $(i_1, i_2, \ldots, i_m)$ would result in the value of the difference between each corresponding entry of $summary_{global}$ indexed by $(i_1, i_2, \ldots, i_m)$ and $summary_x$ indexed by $(i_1, i_2, \ldots, i_m)$, where m is the size of the array. For example, assuming $summary_{global}$ is a 3-entry array containing the values (1, 2, 2) and $summary_x$ is a 3-entry array containing the values (1, 1, 2), then the generated $summary_{diff}$ would be a 3-entry array containing the values (1-1, 2-1, 2-2) or (0, 1, 0). The unique physical space occupied by an MTree is estimated by determining the difference between size of $summary_{global}$ and $summary_{diff}$.

Figure 2:
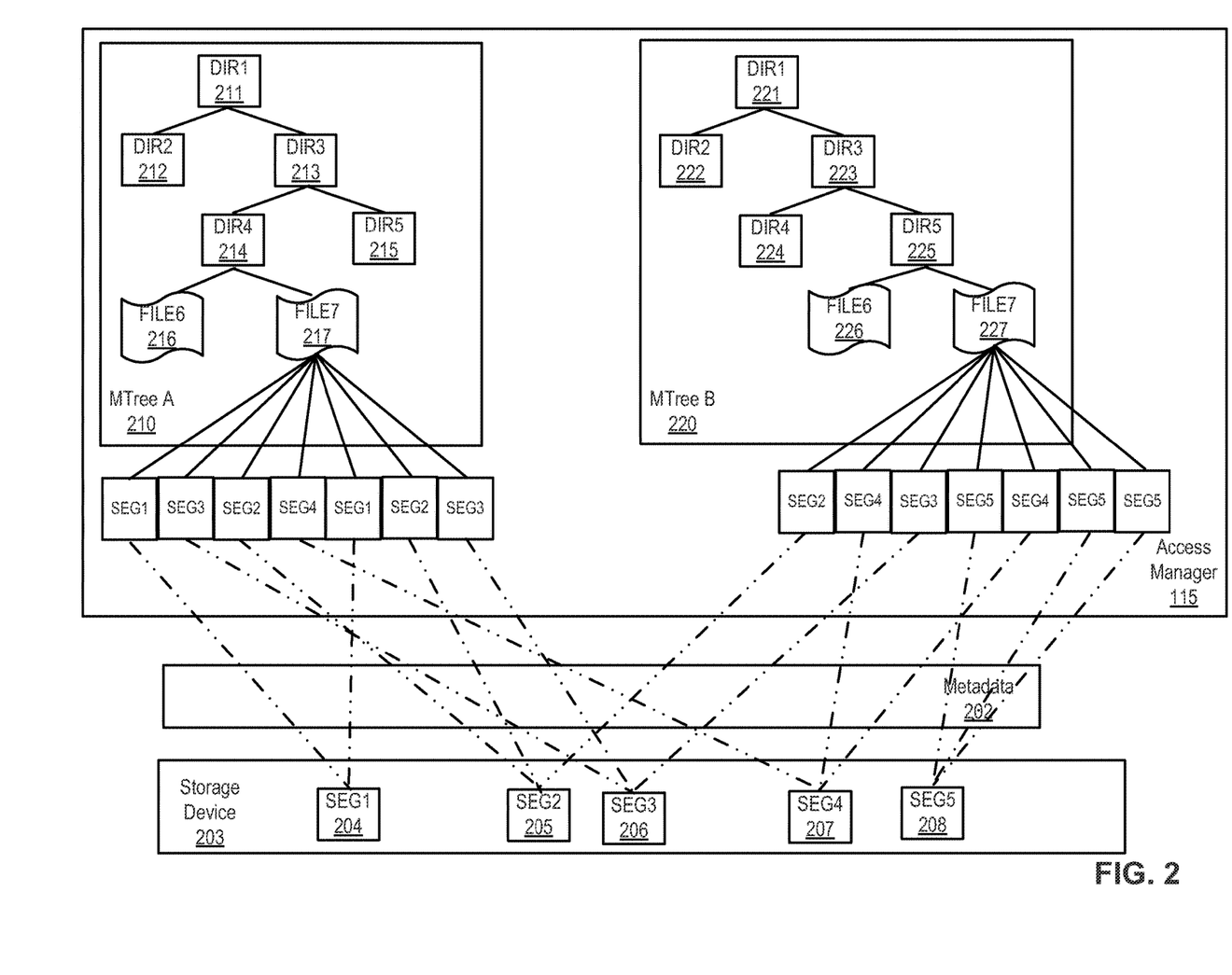
FIG. 2 is a block diagram of an access manager according to one embodiment of the invention.

FIG. 2 illustrates a block diagram of the access manager 115 of FIG. 1. As described above, the access manager 115 enables a user to access data segments on the physical disk storage by implementing several levels of logical abstraction. The deduplicated storage system of FIG. 2 includes an MTree A 210 and an MTree B 220. MTree A contains 3 hierarchies of directories, the highest hierarchy being directory DIR1 211, which is also commonly referred to as the "root" directory. The next hierarchy of directory comprises of subdirectories DIR2 212 and DIR3 213. At the lowest hierarchy of directories are subdirectories DIR4 214 and DIR5 215. Each directory or subdirectory within the entire hierarchy may contain 1 or more files, or they may contain no files at all. As illustrated in FIG. 2, DIR4 214 includes 2 files: FILE6 216 and FILE7 217. At the next level of abstraction, each file is represented by a stream of data segments which are mapped to data segments stored on the physical storage device via fingerprints (hashes), which are included as part of metadata 202. As discussed above, duplicate segments in a file are deduplicated before they are stored onto physical storage space. Thus, for example, although FILE7 217 contains 2 instances of segment SEG1, only one copy of SEG1 is actually stored on the physical storage space. Likewise, MTree B comprises FILE7 227 which consists of multiple data segments. Multiple segments are also deduplicated before being stored on the physical storage space. Note that as illustrated in FIG. 2, segments stored on physical disk space are shared not only by a file within an MTree, but also shared files across multiple MTrees. For example, SEG2 205 is not only referenced twice by FILE7 217 of MTree A 210, but also referenced by FILE7 227 of MTree B 220. Thus, SEG2 205 is contained within the footprint of both MTree A 210 and MTree B 220, i.e., SEG2 205 is not considered part of the unique footprint of either MTree.

Figure 3:
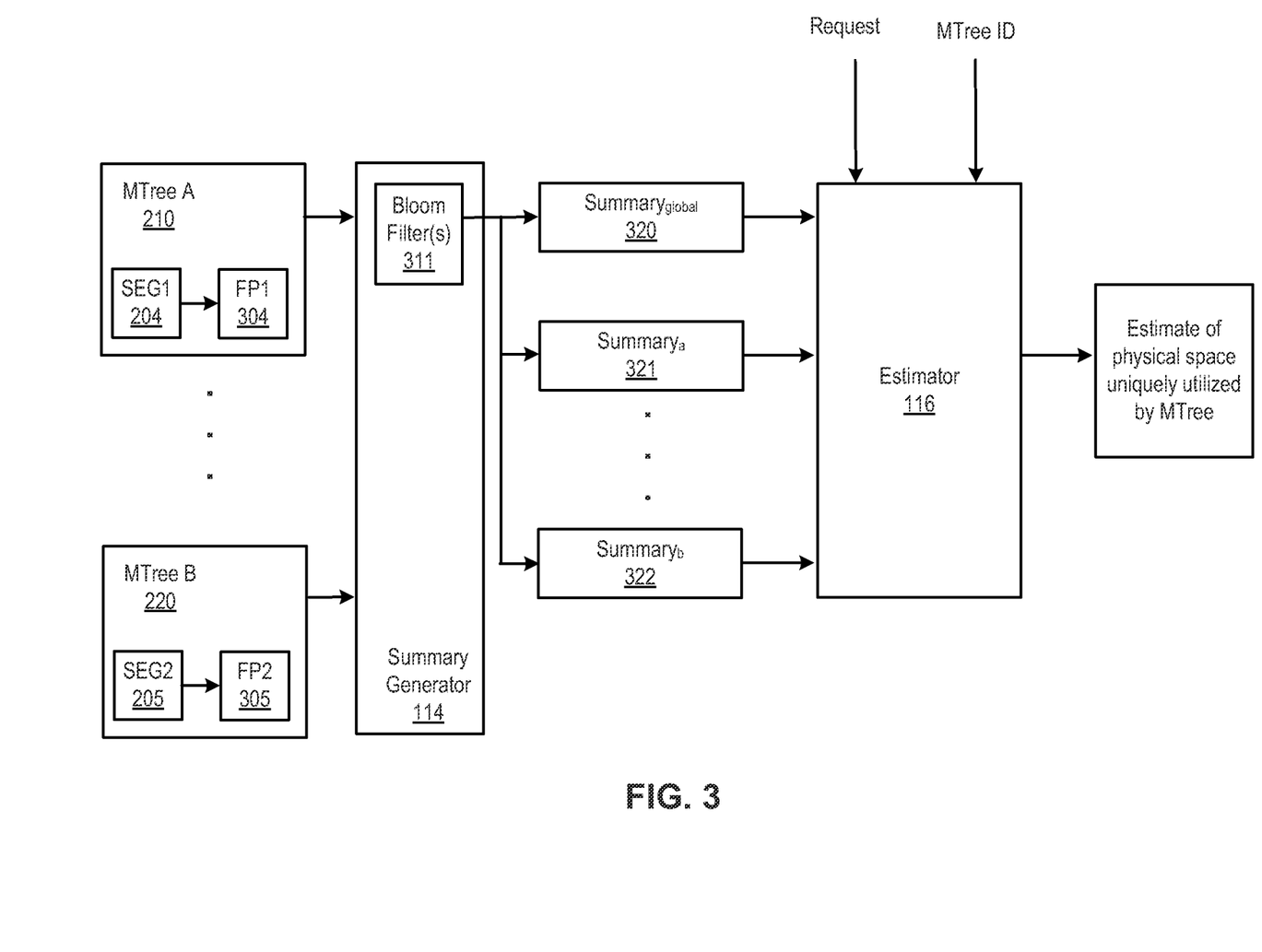
FIG. 3 is a block diagram illustrating the flow of estimating a unique footprint according to one embodiment of the invention.

FIG. 3 illustrates the flow of how data segments on the physical disk storage are used to estimate the unique footprint (i.e., the unique physical space) of a particular MTree. For each data segment that is referenced by an MTree on the deduplicated storage system, a fingerprint is derived by hashing the segment. As discussed above, a fingerprint may be shared, i.e., referenced multiple times by a file within and/or across multiple MTrees. By way of example, FIG. 3 illustrates a deduplicated storage system that includes MTree A 210 referencing segment SEG1 204 which is hashed to FP1 304, and MTree B 220 referencing segment SEG2 205, which is hashed to FP2 305.

In one embodiment, the fingerprints of each MTree are fed through a summary generator such as the summary generator 114 of FIG. 1, which applies a CBF to each input fingerprint, and generates keys that are used as indexes, indicating which entries of the summary data structures are to be incremented. In one embodiment of the invention, a CBF maintains an array of m entries/cells ($c_1, c_2, \ldots, c_m$) that are initially set to 0. A CBF also implements k independent hash functions ($h_1, h_2, \ldots, h_k$), each returning a value between 1 and m. In one embodiment, the hash function may be a SHA1. It will be appreciated, however, that other hash functions may be employed by the CBF. In order to "insert" a new element into the array, each hash function is applied to the element, and based on the return value i of each function ($i_1, i_2, \ldots, i_k$), the entry with the offset i is incremented by 1. Thus, for a given element, up to k entries in the array may be updated. To determine if an element is a member of the array, the CBF applies the same hash functions to the element, and checks whether any of the entry with the offset i is set to 0. If yes, the element is definitely not a member of the array, i.e., it has not been previously inserted into the array. If the answer is no, i.e., all the entries offset by $i_1 \ldots i_k$ are set to 1, then the element is "probably" a member of the array, i.e., it has probably been inserted into the array previously. In other words, a CBF has zero probability of reporting a false negative, but it is susceptible to reporting false positives. The approximate false positive (i.e., error rate) of a CBF is defined by the equation:

$$\text{error rate} = (1 - e^{-(kn)/m})^k, \qquad [\text{equation 2}]$$

where m is the number of entries in the array, k is the number of hash function(s), and n is the number of unique elements stored in the array. Thus, the more hash functions are employed, the lower the probability of the CBF reporting a false positive. Of course, resources may be a limiting factor in determining the number of hash functions to use in a given CBF. Given a known array size and number of elements stored in the array, an "optimal" number of hash functions may also be determined by the equation:

$$k_{opt} = (\ln 2)(m/n), \qquad [\text{equation 3}]$$

where m and n are defined in the text relating to equation 2 above. The size of the array may also vary, depending on the available resources and the tolerable false positive rate. Given the number of elements inserted and the desired probability of false positive, the array size (i.e., number of entries in the array) can be determined by the equation:

$$m = -2n \ln q, \qquad [\text{equation 4}]$$

where m and n are as defined in the text relating to equation 2 above, and q is the tolerable error rate (i.e., false positive). It should also be noted that, in order to minimize the possibility of overflowing an entry, each entry of the arrays are made up of a plurality of bits.

In one embodiment, summary generator 114 includes 1 CBF. In another embodiment, summary generator 114 may include 2 or more CBFs to process the fingerprints and generate the summary data structures. In such an embodiment, the CBFs would have identical characteristics, i.e., they use the same number and type of hash functions. The tradeoff between having more or less CBFs is obviously time versus resources. The more CBFs are used, the less time it will take to compute the summary data structures, but more resources will be required.

Referring back to FIG. 3, an estimator such as estimator 116 of FIG. 1 may be configured to receive a request to estimate a unique footprint of a particular MTree in the deduplicated storage system. In response to receiving this request, estimator 116 is configured to identify and access a $\text{summary}_x$ from physical disk, where x is an MTree identified by an MTree ID. In addition, estimator 116 is also configured to access a $\text{summary}_{global}$.

In order to estimate the unique footprint of an MTree, estimator 116 generates a temporary summary data structure, $\text{summary}_{diff}$, which is an array data structure containing the cell-wise difference between $\text{summary}_{global}$ and $\text{summary}_x$, as discussed above. The unique footprint of an MTree is estimated by computing the difference between the size of $\text{summary}_{global}$ and $\text{summary}_{diff}$, wherein the size of each set is defined by equation:

$$n = (-m/k)\ln(1-p), \qquad [\text{equation 1}]$$

where n is the number of elements (i.e., fingerprints) inserted into the CBF, m is the size of the CBF array, k is the number of hash functions used by the CBF, and p is the fraction of non-zeros in the summary. Thus, estimating of the unique footprint of an MTree x can be reduced to a series of 4 operations:

(1) $\text{summary}_{diff} = \text{summary}_{global} - \text{summary}_x$, [operation 1]

where "−" denotes cell-wise difference between $\text{summary}_{global}$ and $\text{summary}_x$;

(2) $f1$=size of summary$_{global}$=$(-m/k)\ln(1-p_{global})$, [operation 2]

where $p_{global}$ is the fraction of non-zero cells in summary$_{global}$;

(3) $f2$=size of summary$_{diff}$=$(-m/k)\ln(1-p_{temp})$, [operation 3]

where $p_{temp}$ is the fraction of non-zero cells in summary$_{diff}$; and (4) unique footprint of MTree $x$=$f1-f2$. [operation 4]

Figure 4:
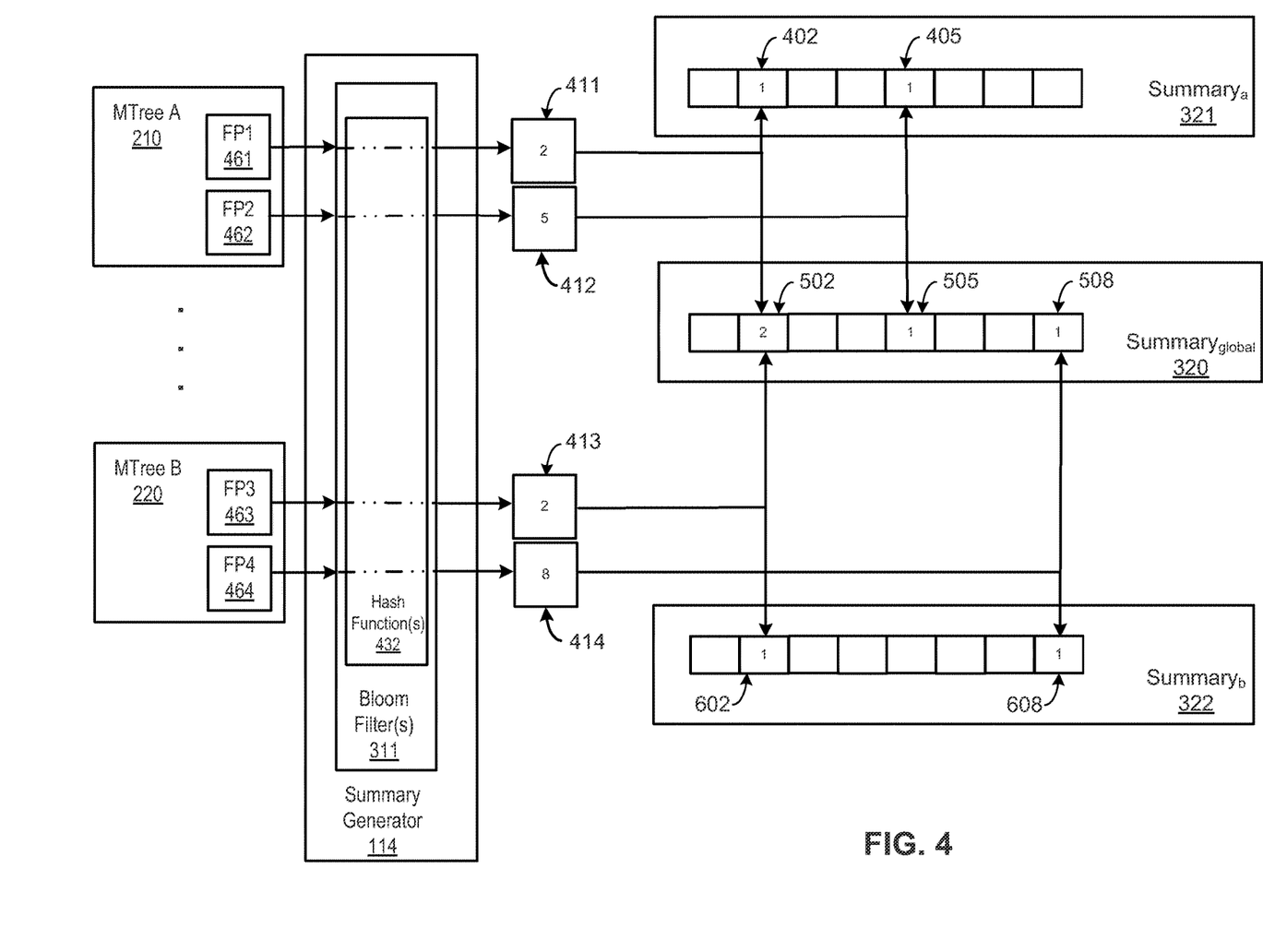
FIG. 4 is a block diagram illustrating the generation of summary data structures of according to one embodiment of the invention.

FIG. 4 illustrates the generation of summary data structures for a deduplicated storage system with MTree A 210 and MTree B 220, wherein each MTree references 2 fingerprints. FIG. 4 illustrates a CBF having 1 hash function, it will be appreciated that a CBF may include 2 or more hash functions. Although only two MTrees are shown, more or fewer MTrees may also be applied. The summary generator is similar to summary generator 114 of FIG. 1 which includes a CBF 311, generating keys, through hash 432, that map to summary$_a$ 321, summary$_b$ 322, and summary$_{global}$, 320.

Referring first to the generation of summary$_a$ 321 and summary$_{global}$ 320 based fingerprints referenced by MTree A 210, fingerprint FP1 461 is fed through hash function 432 which generates key 411 having a value of 2 that maps to the second entry (i.e., entry 402) of summary$_a$ 321, causing the entry to be incremented to 1. Key 411 is also used as an index to the second entry (i.e., entry 502) of summary$_{global}$ 320, causing that entry to be incremented by 1. Hash 432 is then applied to the second and, in this case final, fingerprint FP2 462 of MTree A 210, which produces key 412 having a value of 5, which is used as an index that maps to the fifth entry of summary$_a$ 321 and summary$_{global}$ 320 (entry 405 and entry 505, respectively), causing each entry to be incremented by 1. Thus, after all fingerprints referenced by MTree A 210 have been processed, summary$_a$ 321 and summary$_{global}$ 320 both contain the cell values (0, 1, 0, 0, 1, 0, 0, 0).

Referring now to the generation of summary$_b$ 322 and summary$_{global}$ 320 based fingerprints referenced by MTree B 220, fingerprint FP3 463 is fed through hash 432 which generates key 413 having a value of 2 that maps to the second entry (i.e., entry 602) of summary$_b$ 322, causing the entry to be incremented to 1. Key 413 is also used as an index to the second entry (i.e., entry 502) of summary$_{global}$ 320, causing that entry to be incremented by 1. Hash 432 is then applied to the second and, in this case final, fingerprint FP4 464 of MTree B 220, which produces key 414 having a value of 8, which is used as an index that maps to the eighth entry of summary$_b$ 322 and summary$_{global}$ 320 (entry 608 and entry 508, respectively), causing each entry to be incremented by 1. Thus, after all fingerprints referenced by MTree A 210 and MTree B 220 have been processed, summary$_a$ 321 contains the array values (0, 1, 0, 0, 1, 0, 0, 0), summary$_b$ 322 contains the array values (0, 1, 0, 0, 0, 0, 0, 1), and summary$_{global}$ 320 contain the array values and (0, 2, 0, 0, 1, 0, 0, 1). Entry 502 of summary$_{global}$ 320 contains a value of 2 because key 411 and key 413 both map to that entry, causing it to be incremented twice in this example.

In one embodiment, a deduplicated storage system may be required to provide an estimate of a unique footprint of one of its MTrees. As described above, a unique footprint refers to the physical space that is taken up exclusively by the MTree and not shared with any other MTrees within the deduplicated storage system.

Figure 5:
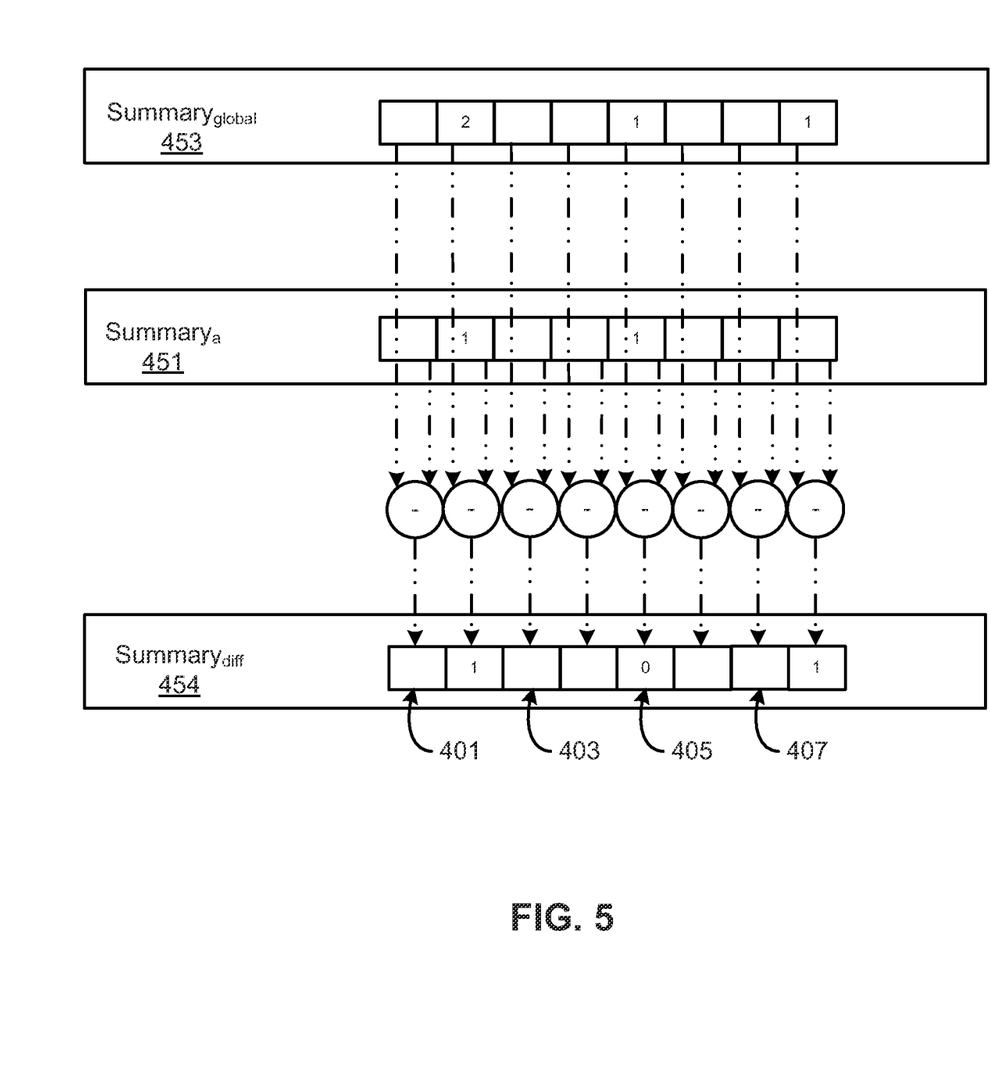
FIG. 5 is a block diagram illustrating the estimating of a unique footprint according to one embodiment of the invention.

FIG. 5 illustrates an example of the summary data structures that would be identified and accessed by estimator 116 of FIG. 1, in response to receiving a request to estimate a storage usage by the MTree A 210 of the deduplicated system of FIG. 4. Based on an identifier indicating MTree A 210 is the MTree for which the unique footprint is to be estimated, estimator 116 identifies and accesses summary$_a$ 451 stored on physical storage. In addition, estimator 116 also accesses summary$_{global}$ 453 from physical storage. In order to estimate the unique footprint of MTree A 210, estimator 116 is configured to perform operation 1 through operation 4 discussed above.

At operation (1), estimator 116 generates a temporary summary data structure, summary$_{diff}$ 454, by performing a cell-wise subtraction of summary$_a$ 451 from summary$_{global}$ 453. The result is an array containing the values (0, 1, 0, 0, 0, 0, 0, 1). In other words, after taking the cell-wise difference between summary$_a$ 451 and summary$_{global}$ 453, the result is an array, summary$_{diff}$ 454, with 2 out of 8 entries having a non-zero value.

At operation (2), estimator 116 is configured to estimate the size of summary$_{global}$, by applying equation 1 discussed above. Here, m=8, k=1, and $p_{global}$=3/8. Thus, $f1$=$(-8/1)\ln(1-(3/8))$=3.760.

At operation (3), estimator 116 estimates the size of summary$_{diff}$, by applying equation 1 discussed above. Here, m=8, k=1, and $p_{temp}$=2/8. Thus, $f2$=$(-8/1)\ln(1-(2/8))$=2.301.

At operation (4), estimator 116 estimates the unique footprint of MTree A 210 by taking the difference between f1 and f2, resulting in a value of 1.459, which represents the estimated number of unique fingerprints referenced by MTree A 210. Assuming each fingerprint maps to a segment that is 8 KB in size, the unique physical space occupied by MTree A 210, i.e., the unique footprint of MTree A 210 is roughly 1.459×8 KB, or 11.672 KB. It should be noted that the configurations of m and n used in this example are chosen for simplicity in illustrating the calculations, thus, they are not realistic and the resulting estimate is quite inaccurate. For a more realistic and accurate estimate of the unique footprint, larger m and n should be chosen.

The above descriptions and illustrations relate to the generation of summary data structures and estimates for unique footprints of MTrees. It will be appreciated, however, that the same methods may be applied to other logical partitions of data storage within any storage system, including for example, snapshots.

In one embodiment of the invention, the summary data structures described above may be continuously updated at all times as fingerprints enter and leave MTrees in the deduplicated system (e.g., when files are added, deleted, or edited). This keeps the summary data structures up to date, but requires a lot of bookkeeping and complicates the logic for hard-links, etc.

In another embodiment, the summary data structures are updated during a maintenance routine of the deduplicated storage system, e.g., during a garbage collection (GC) enumeration phase. This can leave the summary data structures stale until the next round of GC, but it is easy to implement and reduces the load on the system since GC needs to enumerate all fingerprints in the namespace anyway.

Figure 6:
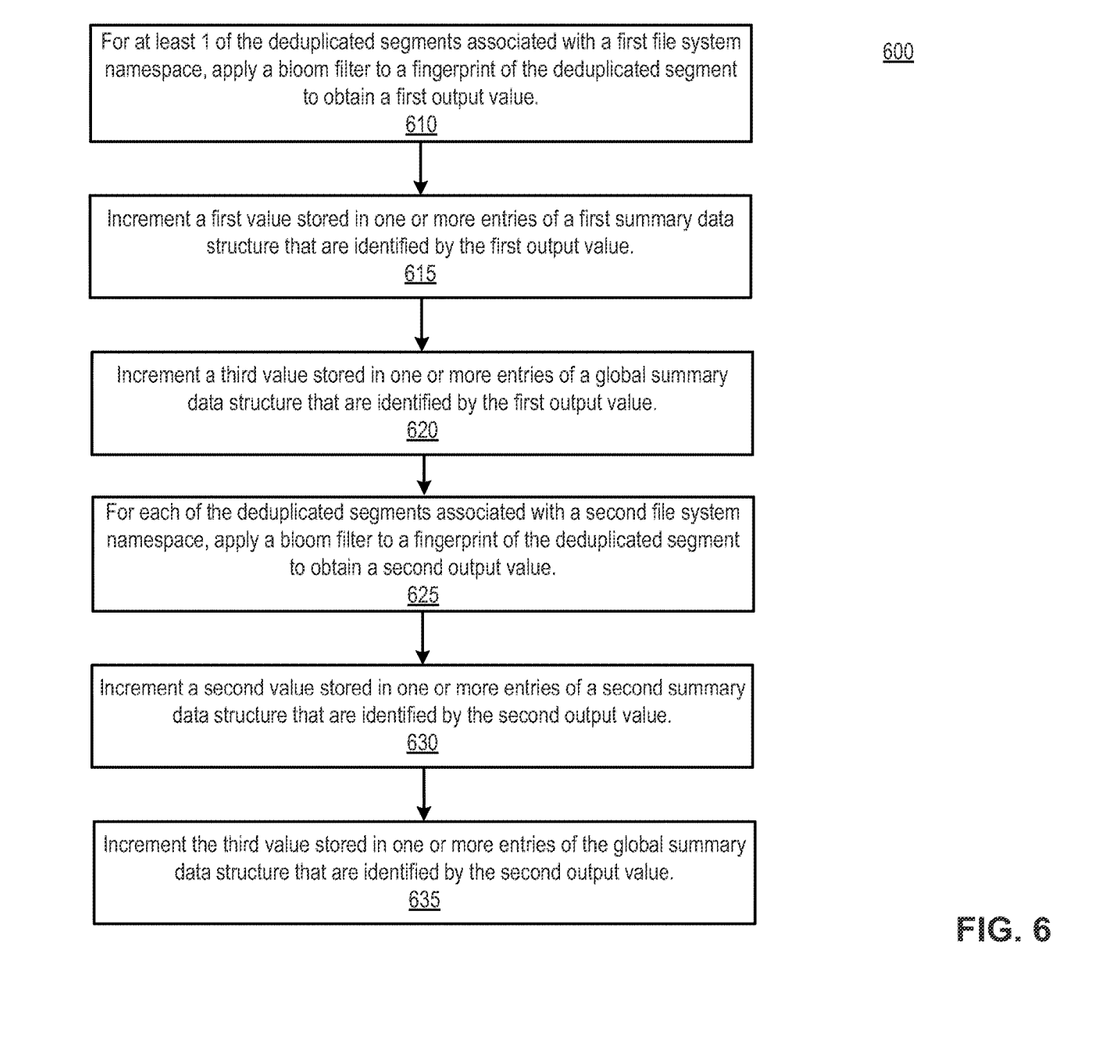
FIG. 6 is a flow diagram illustrating the generation of summary data structures according to one embodiment of the invention.

FIG. 6 is a flow diagram that illustrates an exemplary method 600 of generating summary data structures for file system namespaces within a deduplicated storage system, as illustrated in the text above relating to FIG. 4. Method 600 may be performed by backup engine 106 of FIG. 1, which may be implemented as processing logic in software, hardware, or a combination of both. Note that throughout this application, a backup storage system is utilized as an example of a storage system. The techniques described throughout this application can also be applied to other types of storage systems. For example, backup engine 106 can be implemented as any type of file servers. Referring to FIG. 6, at block 610, a first output (i.e., key/index) is generated by applying a bloom filter to a fingerprint of at least 1 of the deduplicated segments associated with a first file system namespace (e.g., an MTree). In one embodiment, the bloom filter is a CBF, and the first output value is generated by hashing the fingerprint as illustrated in FIG. 4. At block 615, the processing logic increments a first value stored in one or more entries of a first summary data structure that are identified by the first output value, similar to the incrementing of the entry 402 and entry 405 of summary$_a$ 321 of FIG. 4. At block 620, the processing logic increments a third value stored in one or more entries of a global summary data structure that are identified by the first output value, similar to the incrementing of entry 502 and entry 505 of summary$_{global}$ 320 of FIG. 4. At block 625, a second output (i.e., key/index) is generated by applying a bloom filter to a fingerprint of each of the deduplicated segments associated with a second file system namespace (e.g., an MTree). In one embodiment, the bloom filter is a CBF, and the second output value is generated by hashing the fingerprint as illustrated in FIG. 4. At block 630, the processing logic increments a second value stored in one or more entries of a second summary data structure that are identified by the second output value, similar to the incrementing of the entry 602 and entry 608 of summary$_b$ 322 of FIG. 4. At block 635, the processing logic increments the third value stored in one or more entries of the global summary data structure that are identified by the second output value, similar to the incrementing of entry 502 and entry 508 of summary$_{global}$ 320 of FIG. 4.

Figure 7:
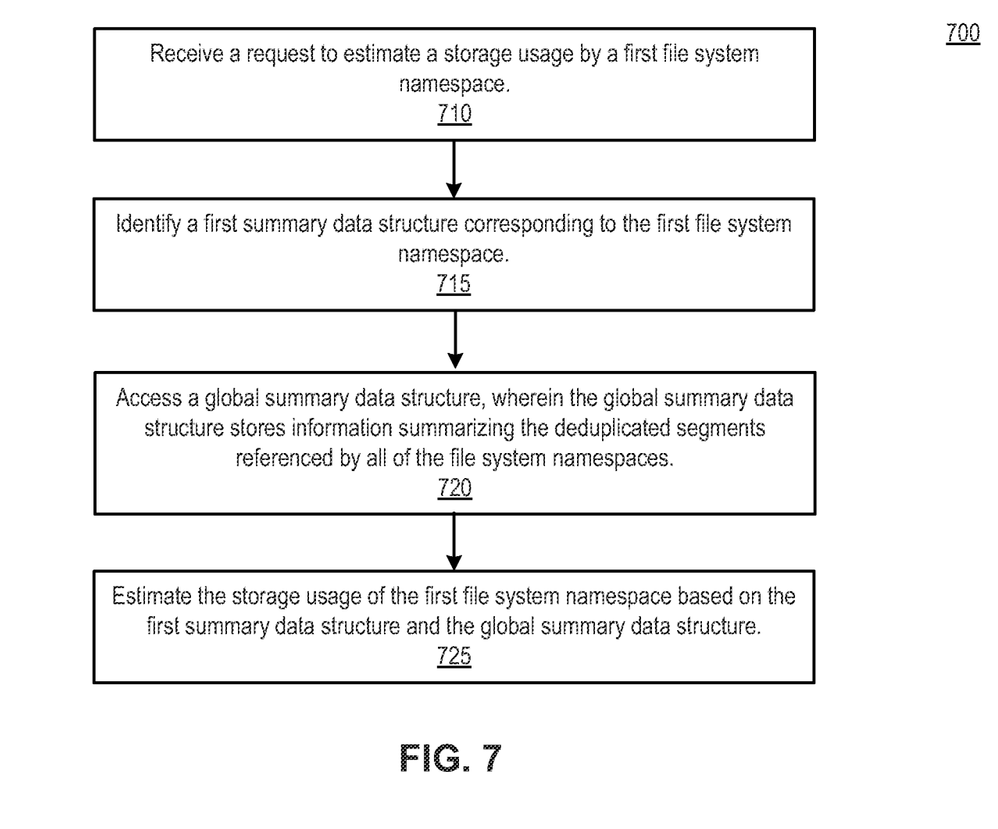
FIG. 7 is a flow diagram illustrating the estimating of a unique footprint according to one embodiment of the invention.

FIG. 7 is a flow diagram illustrating an exemplary method 700 for estimating the storage usage by a file system namespace. Method 700 may be performed by backup engine 106 of FIG. 1, which may be implemented as processing logic in software, hardware, or a combination of both. Referring to FIG. 7, at block 710, a request to estimate a storage usage by a first file system namespace is received. For example, a request to estimate the storage usage by MTree A 210 may be received by estimator 116 as described in the text relating to FIG. 5. At block 715, in response to receiving the request, processing logic identifies a first summary data structure corresponding to the first file system namespace, e.g., summary$_a$ 451 of FIG. 5. At block 720, processing logic accesses a global summary data structure, such as summary$_{global}$ 453 of FIG. 5. At block 725, processing logic estimates the storage usage of the first file system namespace based on the first summary data structure and the global summary data structure. For example, the processing logic may estimate the storage usage by applying the 4 operations discussed above to summary$_{global}$ 453 and summary$_a$ 451.

Figure 8:
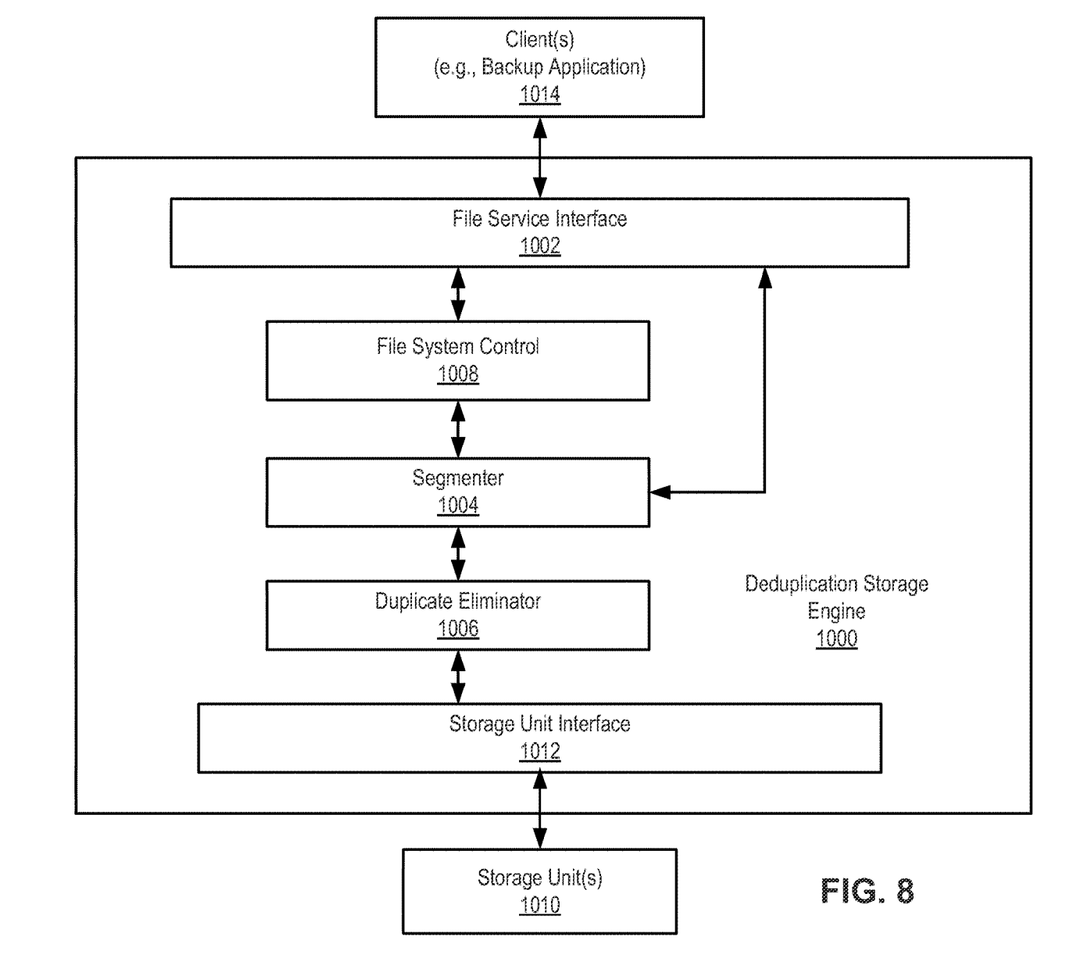
FIG. 8 is a block diagram illustrating a deduplicated storage system according to one embodiment of the invention.

FIG. 8 is a block diagram illustrating a segment storage engine according to one embodiment of the invention. For example, deduplication storage engine 1000 may be implemented as part of a deduplication storage system as described above, such as deduplication storage engine 107 of FIG. 1. Referring to FIG. 9, in one embodiment, deduplication storage engine 1000 includes file service interface 1002, segmenter 1004, duplicate eliminator 1006, file system control 1008, and storage unit interface 1012. Deduplication storage engine 1000 receives a file or files (or data item(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008 processes information to indicate the segment(s) association with a file. In some embodiments, a list of fingerprints is used to indicate segment(s) associated with a file. File system control 1008 passes segment association information (e.g., representative data such as a fingerprint) to an index (not shown). The index is used to locate stored segments in storage units 1010 via storage unit interface 1012. Duplicate eliminator 1006 identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (not shown) into one or more storage containers stored in storage units 1010. The deduplicated segments may be further compressed using a variation of compression algorithms, such as a Lempel-Ziv algorithm before being stored.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates with an index (not shown) to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for estimating storage usage of a storage system, the method comprising:
    maintaining a plurality of summary data structures corresponding to a plurality of logical file system namespaces representing a plurality of hierarchies of one or more directories having one or more files, each file being stored in the storage system as a plurality of segments in a deduplicated manner;
    in response to a request to estimate a storage usage by a first of the file system namespaces, identifying a first of the summary data structures corresponding to the first file system namespace, wherein the first summary data structure stores information summarizing deduplicated segments referenced by one or more files of the first file system namespace, including a number of references made by one or more files of the first file system to the corresponding deduplicated segment; and
    estimating the storage usage of the first file system namespace including determining storage space occupied by deduplicated segments that are only referenced by files of the first file system namespace which further includes performing a cell-wise subtraction between the first summary data structure and a global summary data structure to generate a temporary data structure and determining a difference between sizes of the global summary data structure and the temporary data structure, wherein a size n of any summary data structure is determined based on an equation $n=(-m/k)\ln(1-p)$, where m is a size of a corresponding counting bloom filter (CBF) array, k is a number of hash functions used by the CBF, and p is a fraction of non-zero cells in the summary data structure, wherein the difference indicates an estimated number of unique fingerprints referenced by the first file system namespace, wherein the global summary data structure stores information summarizing deduplicated segments referenced by all of the file system namespaces, including a number of references made by all files of all the file system namespaces to the corresponding deduplicated segment;
    wherein at least a first of the deduplicated segments is referenced by at least one file of the first file system namespace and at least one file of a second of the file system namespaces, wherein an entry of the first summary data structure corresponding to the first deduplicated segment stores a first value representing a number of references made by a file of the first file system namespace, an entry of a second summary data structure corresponding to the first deduplicated segment stores a second value representing a number of references made by a file of the second file system namespace, and an entry of the global summary data structure corresponding to the first deduplicated segment summarizes the first value and the second value.

2. The method of claim 1, wherein maintaining a plurality of summary data structures comprises:
    for each of the deduplicated segments associated with the first file system namespace, generating a first output value based on the deduplicated segment;
    incrementing a value stored in one or more entries of the first summary data structure that are identified by the first output value; and
    incrementing a value stored in one or more entries of the global summary data structure that are identified by the first output value.

3. The method of claim 2, wherein generating the first output value comprises applying a bloom filter to a fingerprint of the deduplicated segment.

4. The method of claim 2, wherein maintaining a plurality of summary data structures further comprises:
    for each of the deduplicated segments associated with the second file system namespace, generating a second output value based on the deduplicated segment;
    incrementing a value stored in one or more entries of the second summary data structure corresponding to the second file system namespace that are identified by the second output value; and incrementing a value stored in one or more entries of the global summary data structure that are identified by the second output value.

5. The method of claim 2, wherein incrementing the value stored in one or more entries of the first and global summary data structures are performed during a maintenance routine of the storage system.

6. The method of claim 1, wherein the plurality of summary data structures are maintained and stored in a persistent storage device of the storage system prior to receiving the request for estimating the storage usage.

7. The method of claim 1, further comprising:
in response to a request to estimate a storage usage by the second file system namespace, identifying the second summary data structure corresponding to the second file system namespace, wherein the second summary data structure stores information summarizing deduplicated segments referenced by one or more files of the second file system namespace, including a number of references made by one or more files of the second file system to the corresponding deduplicated segment; and
estimating the storage usage of the second file system namespace based on the second summary data structure and a global summary data structure.

8. A non-transitory computer-readable storage medium having instructions stored therein, which when executed by a computer, cause the computer to perform operations comprising:
maintaining a plurality of summary data structures corresponding to a plurality of logical file system namespaces representing a plurality of hierarchies of one or more directories having one or more files, each file being stored in the storage system as a plurality of segments in a deduplicated manner;
in response to a request to estimate a storage usage by a first of the file system namespaces, identifying a first of the summary data structures corresponding to the first file system namespace, wherein the first summary data structure stores information summarizing deduplicated segments referenced by one or more files of the first file system namespace, including a number of references made by one or more files of the first file system to the corresponding deduplicated segment; and
estimating the storage usage of the first file system namespace including determining storage space occupied by deduplicated segments that are only referenced by files of the first file system namespace which further includes performing a cell-wise subtraction between the first summary data structure and a global summary data structure to generate a temporary data structure and determining a difference between sizes of the global summary data structure and the temporary data structure, wherein a size n of any summary data structure is determined based on an equation $n=(-m/k)\ln(1-p)$, where m is a size of a corresponding counting bloom filter (CBF) array, k is a number of hash functions used by the CBF, and p is a fraction of non-zero cells in the summary data structure, wherein the difference indicates an estimated number of unique fingerprints referenced by the first file system namespace, wherein the global summary data structure stores information summarizing deduplicated segments referenced by all of the file system namespaces, including a number of references made by all files of all the file system namespaces to the corresponding deduplicated segment;
wherein at least a first of the deduplicated segments is referenced by at least one file of the first file system namespace and at least one file of a second of the file system namespaces, wherein an entry of the first summary data structure corresponding to the first deduplicated segment stores a first value representing a number of references made by a file of the first file system namespace, an entry of a second summary data structure corresponding to the first deduplicated segment stores a second value representing a number of references made by a file of the second file system namespace, and an entry of the global summary data structure corresponding to the first deduplicated segment summarizes the first value and the second value.

9. The non-transitory computer-readable storage medium of claim 8, wherein maintaining a plurality of summary data structures comprises:
for each of the deduplicated segments associated with the first file system namespace, generating a first output value based on the deduplicated segment;
incrementing a value stored in one or more entries of the first summary data structure that are identified by the first output value; and
incrementing a value stored in one or more entries of the global summary data structure that are identified by the first output value.

10. The non-transitory computer-readable storage medium of claim 9, wherein generating the first output value comprises applying a bloom filter to a fingerprint of the deduplicated segment.

11. The non-transitory computer-readable storage medium of claim 9, wherein maintaining a plurality of summary data structures further comprises:
for each of the deduplicated segments associated with the second file system namespace, generating a second output value based on the deduplicated segment;
incrementing a value stored in one or more entries of the second summary data structure corresponding to the second file system namespace that are identified by the second output value; and
incrementing a value stored in one or more entries of the global summary data structure that are identified by the second output value.

12. The non-transitory computer-readable storage medium of claim 9, wherein incrementing the value stored in one or more entries of the first and global summary data structures are performed during a maintenance routine of the storage system.

13. The non-transitory computer-readable storage medium of claim 8, wherein the plurality of summary data structures are maintained and stored in a persistent storage device of the storage system prior to receiving the request for estimating the storage usage.

14. The non-transitory computer-readable storage medium of claim 8, wherein the operations comprise:
in response to a request to estimate a storage usage by the second file system namespace, identifying the second summary data structure corresponding to the second file system namespace, wherein the second summary data structure stores information summarizing deduplicated segments referenced by one or more files of the second file system namespace, including a number of references made by one or more files of the second file system to the corresponding deduplicated segment; and
estimating the storage usage of the second file system namespace based on the second summary data structure and a global summary data structure.

15. A data processing system, comprising:
a processor; and
a memory to store instructions, which when executed from the memory, cause the processor to maintain a plurality of summary data structures corresponding to a plurality of logical file system namespaces representing a plurality of hierarchies of one or more directories having one or more files, each file being stored in the storage system as a plurality of segments in a deduplicated manner;

in response to a request to estimate a storage usage by a first of the file system namespaces, identify a first of the summary data structures corresponding to the first file system namespace, wherein the first summary data structure stores information summarizing deduplicated segments referenced by one or more files of the first file system namespace, including a number of references made by one or more files of the first file system to the corresponding deduplicated segment; and estimate the storage usage of the first file system namespace including determining storage space occupied by deduplicated segments that are only referenced by files of the first file system namespace, wherein in estimating the storage usage of the first file system namespace, the processor is to at least in part perform a cell-wise subtraction between the first summary data structure and a global summary data structure to generate a temporary data structure, and determine a difference between sizes of the global summary data structure and the temporary data structure, wherein a size n of any summary data structure is determined based on an equation $n=(-m/k) \ln(1-p)$, where m is a size of a corresponding counting bloom filter (CBF) array, k is a number of hash functions used by the CBF, and p is a fraction of non-zero cells in the summary data structure, wherein the difference indicates an estimated number of unique fingerprints referenced by the first file system namespace, wherein the global summary data structure stores information summarizing deduplicated segments referenced by all of the file system namespaces, including a number of references made by all files of all the file system namespaces to the corresponding deduplicated segment;

wherein at least a first of the deduplicated segments is referenced by at least one file of the first file system namespace and at least one file of a second of the file system namespaces, wherein an entry of the first summary data structure corresponding to the first deduplicated segment stores a first value representing a number of references made by a file of the first file system namespace, an entry of a second summary data structure corresponding to the first deduplicated segment stores a second value representing a number of references made by a file of the second file system namespace, and an entry of the global summary data structure corresponding to the first deduplicated segment summarizes the first value and the second value.

16. The data processing system of claim 15, wherein in maintaining a plurality of summary data structures, the processor is to for each of the deduplicated segments associated with the first file system namespace, generate a first output value based on the deduplicated segment;

increment a value stored in one or more entries of the first summary data structure that are identified by the first output value; and increment a value stored in one or more entries of the global summary data structure that are identified by the first output value.

17. The data processing system of claim 16, wherein in generating the first output value, the processor is to apply a bloom filter to a fingerprint of the deduplicated segment.

18. The data processing system of claim 16, wherein in maintaining a plurality of summary data structures, the processor is further to for each of the deduplicated segments associated with the second file system namespace, generate a second output value based on the deduplicated segment;

increment a value stored in one or more entries of the second summary data structure corresponding to the second file system namespace that are identified by the second output value; and increment a value stored in one or more entries of the global summary data structure that are identified by the second output value.

19. The data processing system of claim 16, wherein incrementing the value stored in one or more entries of the first and global summary data structures are performed during a maintenance routine of the storage system.

20. The data processing system of claim 15, wherein the plurality of summary data structures are maintained and stored in a persistent storage device of the storage system prior to receiving the request for estimating the storage usage.

21. The data processing system of claim 15, wherein the stored instructions further cause the processor to in response to a request to estimate a storage usage by the second file system namespace, identify the second summary data structure corresponding to the second file system namespace, wherein the second summary data structure stores information summarizing deduplicated segments referenced by one or more files of the second file system namespace, including a number of references made by one or more files of the second file system to the corresponding deduplicated segment; and estimate the storage usage of the second file system namespace based on the second summary data structure and a global summary data structure.

* * * * *